(12) United States Patent
Enokida et al.

(10) Patent No.: US 11,624,862 B2
(45) Date of Patent: Apr. 11, 2023

(54) OPTICAL ELEMENT, SPECTROSCOPIC APPARATUS, AND METHOD FOR MANUFACTURING THE SAME

(71) Applicant: CANON KABUSHIKI KAISHA, Tokyo (JP)

(72) Inventors: Yukiya Enokida, Kawasaki (JP); Masatsugu Koyama, Yokohama (JP); Yukinobu Okura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 16/156,302

(22) Filed: Oct. 10, 2018

(65) Prior Publication Data

US 2019/0041557 A1     Feb. 7, 2019

Related U.S. Application Data

(62) Division of application No. 14/737,704, filed on Jun. 12, 2015, now abandoned.

(30) Foreign Application Priority Data

Jun. 19, 2014   (JP) .................................. 2014-126678

(51) Int. Cl.
*G02B 5/18*     (2006.01)
*C25D 7/08*     (2006.01)
(Continued)

(52) U.S. Cl.
CPC ............. *G02B 5/1861* (2013.01); *C25D 3/38* (2013.01); *C25D 7/08* (2013.01); *G02B 5/1814* (2013.01); *G02B 5/1847* (2013.01)

(58) Field of Classification Search
CPC .. G02B 5/1814; G02B 5/1847; G02B 5/1861; C25D 3/28; C25D 7/08; C03B 11/082;
(Continued)

(56) References Cited

U.S. PATENT DOCUMENTS 5,436,764 A  *  7/1995  Umetani ............... B29C 43/021
                                                         264/1.21
5,999,318 A      12/1999  Morton et al.
(Continued)

FOREIGN PATENT DOCUMENTS

JP       58098703 A  *  6/1983   ........... G02B 5/0808
JP       S58-098703 A     6/1983
(Continued)

OTHER PUBLICATIONS

Linear Thermal Expansion Coefficients of Metals and Alloys, 2002, Laser and Optics User's manual, 17-1-17-12 (Year: 2002).*
(Continued)

*Primary Examiner* — Ephrem Z Mebrahtu
(74) *Attorney, Agent, or Firm* — Venable LLP

(57) ABSTRACT

An optical element formed of a plurality of materials includes a middle layer between a base material and a reflecting member so as to suppress stripping, cracking and the like of the optical surface due to the difference in coefficients of thermal expansion among the component materials, in the case where a temperature difference in the service environment or a temperature difference between a manufacturing environment and the service environment is large.

20 Claims, 8 Drawing Sheets

(51) Int. Cl.
  *C25D 3/28* (2006.01)
  *C25D 3/38* (2006.01)
(58) Field of Classification Search
  CPC . C03B 2215/30; C03B 2215/31; C03C 17/10; C03C 17/40
  See application file for complete search history.

(56) References Cited

U.S. PATENT DOCUMENTS

| | | | |
|---|---|---|---|
| 6,377,655 B1* | 4/2002 | Murakami | G03F 7/702 378/43 |
| 6,829,050 B2 | 12/2004 | Ikeda et al. | |
| 8,774,247 B2 | 7/2014 | Sukegawa et al. | |
| 9,285,270 B2 | 3/2016 | Shibayama et al. | |
| 9,594,197 B2 | 3/2017 | Shibayama et al. | |
| 9,851,247 B2 | 12/2017 | Shibayama et al. | |
| 2002/0098257 A1 | 7/2002 | Ikeda et al. | |
| 2004/0169929 A1 | 9/2004 | Sato et al. | |
| 2007/0177244 A1 | 8/2007 | Jang et al. | |
| 2008/0088930 A1* | 4/2008 | Nagano | G02B 5/1857 359/566 |
| 2009/0101208 A1* | 4/2009 | Vandal | F24S 25/65 136/259 |
| 2009/0178488 A1 | 7/2009 | Kuzdrall | |
| 2010/0268055 A1 | 10/2010 | Jung et al. | |
| 2012/0033214 A1* | 2/2012 | Zimmer | G02B 5/1847 356/328 |
| 2013/0038874 A1 | 2/2013 | Shibayama et al. | |
| 2013/0057952 A1 | 3/2013 | Risse et al. | |
| 2013/0071680 A1 | 3/2013 | Lv et al. | |
| 2013/0170056 A1* | 7/2013 | Ekstein | G21K 1/06 359/838 |
| 2015/0015957 A1 | 1/2015 | Kawasaki et al. | |
| 2015/0205017 A1 | 7/2015 | Shibayama et al. | |
| 2015/0369977 A1 | 12/2015 | Enokida et al. | |
| 2016/0161334 A1 | 6/2016 | Shibayama et al. | |
| 2017/0160449 A1 | 6/2017 | Shibayama et al. | |
| 2019/0041557 A1 | 2/2019 | Enokida et al. | |

FOREIGN PATENT DOCUMENTS

| | | | |
|---|---|---|---|
| JP | S63-139222 A | 6/1988 | |
| JP | S63-269102 A | 11/1988 | |
| JP | H04-084713 A | 3/1992 | |
| JP | 11071120 A * | 3/1999 | ........... C03B 11/082 |
| JP | H11-133217 A | 5/1999 | |
| JP | H11-147255 A | 6/1999 | |
| JP | 2001-079854 A | 3/2001 | |
| JP | 2001-242314 A | 9/2001 | |
| JP | 2002-214414 A | 7/2002 | |
| JP | 2003-128423 A | 5/2003 | |
| JP | 2008-233528 A | 10/2008 | |
| JP | 2011-215074 A | 10/2011 | |
| JP | 2014-032368 A | 2/2014 | |
| JP | 6188743 B2 | 8/2017 | |

OTHER PUBLICATIONS

Stephen Eikenberry, et al., "FISICA: The Florida Image Slicer for Infrared Cosmology & Astrophysics", Proceedings of SPIE, vol. 6269, Jun. 28, 2006, pp. 62694L-1 through 62694L-8.

S. Vives, et al., "New technological developments in Integral Field Spectroscopy", Proceedings of SPIE, vol. 7018, Jul. 14, 2008, pp. 70182N-1 through 70182N-10.

Linear Temperature Expansion Coefficient for Aluminum, Quartz and other common materials (http://www.engineeringtoolbox.com/linear-expansion-coefficients-d_95.html).

User's Manual for Linear Thermal Coefficients of Metals and Alloys, by Agilent Technologies U.S.A. (Jul. 2002), pp. 17-1 through 17-12.

Mar. 3, 2020 Japanese Official Action in Japanese Patent Appln. No. 2017-149945.

Kitagawa, "Optical design in image slicer type surface" (Dec. 2013).

Kitagawa, "Development of elemental technology for the development of image slicer-type surface spectroscopy" (Oct. 2014).

* cited by examiner

OPTICALLY FUNCTIONAL CURVED SURFACE SECTIONAL PROFILE

OPTICALLY FUNCTIONAL FLAT SURFACES SECTIONAL PROFILE

OPTICAL ELEMENT, SPECTROSCOPIC APPARATUS, AND METHOD FOR MANUFACTURING THE SAME

This application is a division of application Ser. No. 14/737,704 filed Jun. 12, 2015.

BACKGROUND OF THE INVENTION

Field of the Invention

The present invention provides an optical element for spectroscopy and a spectroscopic apparatus using the same, particularly in an astronomical observation field and the like, which are suitable when light having a predetermined wavelength is measured. The present invention further relates to an optical element which is used for an image slicer type reflective optical system, in a spectroscopic apparatus having an optical system for integrated field.

Description of the Related Art

The integrated field is known as an observation technique in an astronomical observation field, and can observe simultaneously spectra of two-dimensional spatial information which is acquired by one exposure. The observation apparatus is roughly divided into three types which are a micro-lens array type, a fiber array type and an image slicer type. As in Eikenberry et al. Proceedings of SPIE, Vol. 6269 62694L (2006/6/28 P.8), it is known that the image slicer type optical system is complicated, but has little loss of the spatial information, and has high spatial resolution even in a narrow visual field.

There are several representative optical elements in the image slicer type optical system. For instance, there are a slicer mirror array (Slicer Mirror Array), a pupil mirror array (Pupils Mirror Array), a slit mirror array (Slits Mirror array), a reflecting type grating and the like. Eikenberry et al. Proceedings of SPIE, Vol. 6269 62694L (2006/6/28 P.8) discloses a method of forming an optical surface directly on a surface by cutting using aluminum for a base material. Vives et al. Proceedings of SPIE, Vol. 7018 70182N (2008/7/14 P.10) proposes a method of directly forming an optical surface by subjecting a glass surface to a polishing to give a reflecting film using glass for the base material.

Eikenberry et al. Proceedings of SPIE, Vol. 6269 62694L (2006/6/28 P.8) discloses that the method uses a bulk material of Al for the base material, thereby enabling a plurality of optical surfaces to be formed on a single base material by the cutting, and achieving a relative positional relationship among the plurality of optical surfaces with high precision. However, a coefficient of thermal expansion of Al is approximately $23 \times 10^{-6}$ which is high among those of metals, and the influence of thermal expansion and thermal contraction of the base material itself is large, depending on a service environment, and compatibility with a supporting mechanism should be sufficiently taken into consideration. In addition, the machinability of Al by a diamond tool is not necessarily adequate, and surface roughness is, therefore, limited to approximately 5 nm Rms. It is difficult to apply the element having such a surface roughness to observation in a visible light region.

Vives et al. Proceedings of SPIE, Vol. 7018 70182N (2008/7/14 P.10) discloses the method of subjecting the base material of glass to the polishing so as to impart adequate surface roughness, because a wavelength in a visible light region is an object to be observed. However, it is difficult to integrally polish a mirror array from a viewpoint of a manufacturing method, and it is difficult for an assembling method to provide the same positional precision as that of the integral working, because relative positions of the mirrors depend on assembly precision. In addition, as is illustrated in FIG. 11, the element is structured so that a metal reflecting film 102 of Al is applied onto a glass base material 101, in order to enhance a reflectance for a specific wavelength. For this reason, there is a possibility that stripping and/or cracking of the reflecting film of metallic Al occurs due to the difference between coefficients of thermal expansion. Furthermore, such a possibility cannot be eliminated that the glass base material is broken. When an optical element is placed under a special environment (for instance, extreme environment of cosmic space and the like, and severe natural environment such as desert and mountainous area) in the astronomical observation field, a thermal effect thereof is large. Owing to this, there is a high possibility that such problems occur that a material which constitutes the element causes fracture and/or deformation phenomena such as stripping and cracking, and besides that it is difficult to maintain the shape precision of the whole element.

The present invention has been designed with respect to the above described problems, and achieves surface roughness of high quality, which can be also applied to observation in a visible light region, while keeping a relative positional relationship among a plurality of optical surfaces on a single base material with high precision. Along with the above item, an object of the present invention is to provide an optical element which can reduce the occurrence of stripping and cracking of a material that constitutes the element due to a thermal influence even under an extreme environment, and which can maintain a shape precision of the element.

SUMMARY OF THE INVENTION

According to an aspect of the present invention, an optical element having a plurality of optical surfaces comprises: a middle layer between a base material and a reflecting layer, wherein the base material has a thermal expansion coefficient $Tb$, the middle layer has a thermal expansion coefficient $Ti$, the reflecting layer has a thermal expansion coefficient $Tr$, to meet a relation: $Tb < Ti < Tr$.

According to a further aspect of the present invention, an optical element having a plurality of optical surfaces comprises: a middle layer between a base material and a reflecting layer, wherein the middle layer contains Cu or Ni as a main ingredient.

According to a still further aspect of the present invention, a manufacturing method of an optical element having a plurality of optical surfaces comprises: manufacturing a base material; forming a middle layer by a plating on the base material; forming the optical surface on the middle layer; and forming a reflecting layer on the middle layer, on which the optical surface is formed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An optical element for integrated field of the present invention, which is an optical element having a plurality of optical surfaces thereon, has such a structure that: a shape is formed which has a base material that is a base of the element and has an optical function in at least one layer of middle layers that are stacked on the base material; and a reflecting layer is further stacked thereon which is the optical surface having reflecting characteristics corresponding to a wavelength of a ray of light to be observed.

A material of the above described base material is not limited, and it is desirable to select a material particularly having a small difference in thermal expansion coefficient between the base material and the reflecting film. Considering that the base material is used in an environment in which a change of temperature is large, it is also acceptable to select a material which is generally referred to as a low thermal expansion material.

As for a material to be used for the above described middle layer, it is desirable to select a material in which an optical shape tends to be easily worked. It is important to form a relative positional relationship among the plurality of optical surfaces which is finely aligned, with high precision, and to form a smooth mirror surface so that light which is the object to be observed does not scatter excessively, particularly in terms of the function of the optical element for integrated field. Owing to this, it is desirable to select a material showing excellent specularity after cutting with the use of a diamond tool. In addition, in order to alleviate fracture and deformation phenomena such as cracking and stripping due to the difference in thermal expansion coefficient between the base material and the reflecting layer under the environment in which the change of the temperature is large, which are the above described problems, a material is selected for the middle layer, which has an intermediate thermal expansion coefficient between those of the base material and the reflecting layer.

As for a material to be used for the reflecting layer, a material is selected which can reflect a wavelength of the light to be observed and can provide constant reflection efficiency. It is also acceptable to select a metal material which is easy to be formed into a thin film and is suitable for vapor deposition, particularly in order that the reflecting layer acquires a reflecting function without destroying the optical shape which has been formed on the middle layer.

None of the materials is limited to specific ones as long as the materials have functions required for the base material, the middle layer and the reflecting layer, respectively, and various materials may be selected.

First Embodiment

Figure 1:
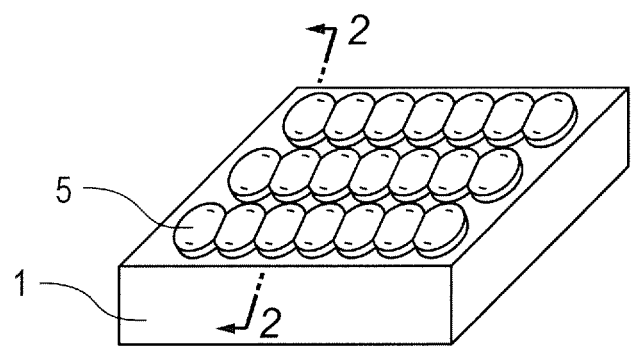
FIG. 1 is a schematic view illustrating a material configuration of an optical element for integrated field of the present invention.

Next, an optical element having a plurality of optical surfaces thereon will be described below, as a first embodiment of the present invention. FIG. 1 is a view illustrating one example of a shape of the optical element.

Figure 2:
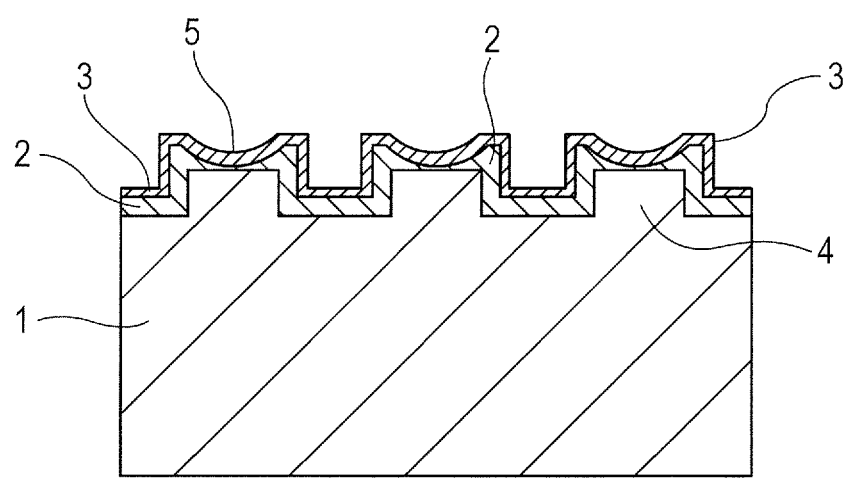
FIG. 2 is a schematic view, along line 2-2 in FIG. 1, illustrating one example of an element shape of the optical element for integrated field of the present invention.
Figure 3A:
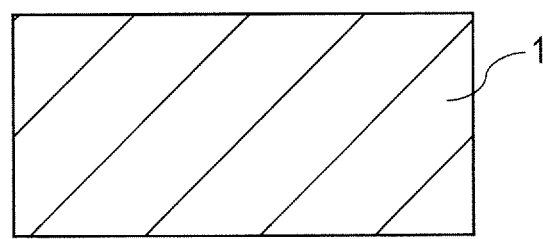
FIGS. 3A, 3B, 3C, 3D and 3E are schematic views illustrating a process of producing the element, for achieving an element structure in Embodiment 1 of the present invention.
Figure 3B:
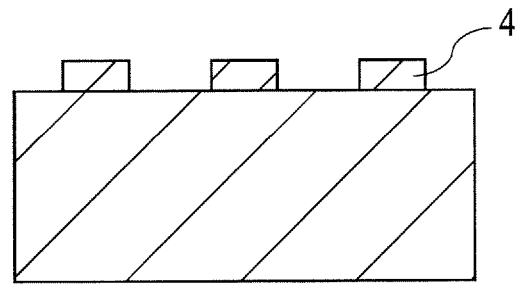
Figure 3C:
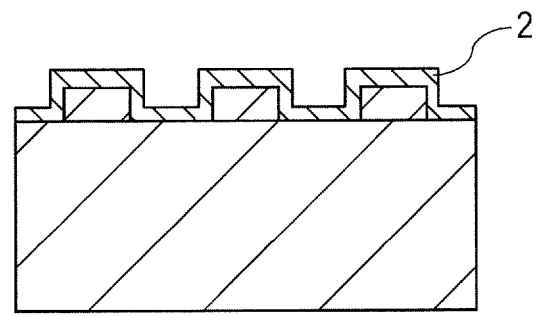
Figure 3D:
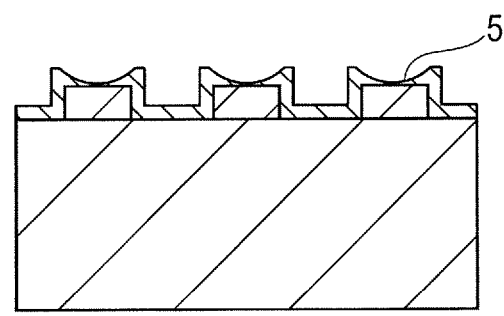
Figure 3E:
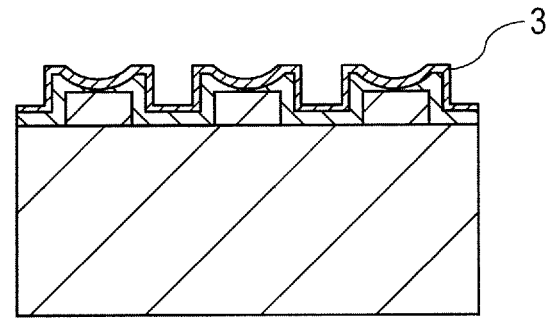

FIG. 2 is a view illustrating a cross section taken along line 2-2 in FIG. 1. In FIG. 1 and FIG. 2, a base material 1, a middle layer 2 and a reflecting layer 3 are illustrated. A foundation structure 4 is formed in the upper part of the base material. An optical surface 5 is illustrated. The optical surface 5 is a flat surface or a curved surface, and has a smooth mirror surface. In addition, the plurality of optical surfaces is arrayed on the base material, and arranged so that normal lines on the plurality of optical surfaces are in different directions. A mutual positional relationship and a surface shape of the plurality of optical surfaces are formed with high precision, in order to exhibit desired optical characteristics.

The thicknesses of the middle layer 2 and the reflecting layer 3 can be set at fixed values or less, in an environment in which the change of the temperature is large. The foundation structure 4 is provided so as to set the thicknesses of the middle layer and the reflecting layer at fixed values or less. This foundation structure 4 is formed so as to have a shape which is as close to the shape of the optical surface as possible. This foundation structure 4 may be formed by working the upper face of the base material, or may also be formed of a completely different member.

The base material 1 can be formed of any one of a pre-harden steel which corresponds to SUS420J2, a low thermal expansion material, quartz and glass. The middle layer 2 can be a plated film which is excellent in specularity and contains Cu or Ni as a main ingredient. In addition, the middle layer 2 may be formed of a plurality of materials which is stacked. In this case, among the plurality of materials, a material of the layer which comes in direct contact with the above described base material can have the smallest difference in coefficients of thermal expansion between the layer and the above described base material, and a material of the layer which comes in direct contact with the above described reflecting layer can have the smallest difference in coefficients of thermal expansion between the layer and the above described reflecting layer 3.

The reflecting layer 3 can be a metal film that contains any one of Au, Ag and Al as a main ingredient, which have excellent reflecting characteristics in a visible light region. In addition, the reflecting layer 3 may be a layer which is formed of many dielectric films that are stacked. Candidate materials for the base material 1 include, for instance, SUS, BK7, Invar (registered trademark), ULE (registered trademark), Zerodur (registered trademark) and Clearceram (registered trademark).

In particular, the base material 1 can be the pre-harden steel corresponding to SUS420J2, the middle layer can be a plated film which contains Cu as a main ingredient, and the reflecting layer can be a metal film which contains Ag as a main ingredient. These materials have thermal expansion coefficients which have a relationship of base material<middle layer<reflecting layer, as is illustrated in Table 1, and can alleviate fracture and deformation phenomena due to the difference in the thermal expansion coefficient between the base material and the reflecting layer.

TABLE 1

| Name of material | Thermal expansion coefficient $[10^{-6}\ 1/K]$ |
| --- | --- |
| SUS | 10.4 |
| Cu | 16.8 |
| Ag | 18.9 |

Next, a method for manufacturing an optical element will be described below.

FIGS. 3A, 3B 3C, 3D and 3E are sectional views illustrating a process of manufacturing the optical element. In FIGS. 3A, 3B 3C, 3D and 3E, the base material 1, the middle layer 2, the reflecting layer 3, the foundation structure 4 and the optical surface 5 are illustrated.

Firstly, the pre-harden steel corresponding to SUS420J2 is selected as the base material 1, and, for instance, a cube of approximately 70 mm×70 mm×160 mm is cut out from the bulk material. It is desirable to work at least an installation fiducial portion (for instance, corner portion) when the optical element is worked, so as to make the precision of the flatness and perpendicularity high.

Next, the upper part of the cube is subjected to additional work so that the upper part becomes a shape along the optical surface in consideration of a positional relationship with the previous installation fiducial portion, as the foundation structure 4 for forming the optical surface in the optical system for integrated field, which is designed and arranged so as to obtain desired optical characteristics.

Next, such a middle layer 2 is formed of stacked layers as to satisfy both of a function of alleviating a stress which is generated between the reflecting layer 3 and the base material 1, and a function of being capable of forming relative positional relationships among the plurality of optical surfaces which is finely aligned, with high precision. For instance, a copper sulfate plated material is selected as a material excellent in mirror-finish workability in particular. The copper sulfate plated material is an electroplated film which contains copper as a main ingredient, and forms a dense layered film with a wet process. As for the thickness of the plated layer, the thickness of the middle layer shall be, for instance, 300 μm, so as to reduce stripping and cracking of the optical surface due to a thermal influence even under an extreme environment, and to enable fine cutting. However, the thickness is not limited to 300 μm, and may be 10 μm or more and 3,000 μm or less. A lower limit of the film thickness of the middle layer is not limited as long as the value is a numerical value which ensures an error and a fixed removal amount at the time of working in the cutting, and is generally approximately 10 μm. Furthermore, the upper limit of the film thickness of the middle layer is not limited as long as a dense plated film for creating a smooth mirror surface thereon can be formed, and is generally approximately 3,000 μm, also from the viewpoint of reducing an increase of an internal stress of plated film.

Next, the middle layer 2 is removed by a fine cutting, for instance, with the use of a diamond tool of which the cutting edge has a curved portion, in consideration of the above described positional relationship with the installation fiducial portion, and thereby the optical surface shape having a curved surface is formed. In the fine cutting, it is necessary to form a smooth mirror surface which has 0.5 nm RMS or more and 2 nm RMS or less, and further can have 1 nm RMS or less, in order that the light to be observed does not scatter excessively, and as for a working condition at this time, it is desirable to set a removal thickness so as to be as small as possible. The curved portion of the tool is set at R20 mm, for instance, and a cusp height which is a target is set at PV2 nm or less.

Finally, a reflecting layer 3 is formed which contains, for instance, silver having excellent reflecting characteristics in a visible light region. The reflecting layer needs to be formed into a thin film having a uniform thickness so that the shape of the optical surface formed on the middle layer is not destroyed as much as possible, and accordingly can be formed by a sputtering process, but the method is not limited to the sputtering process. It is also acceptable to employ various manufacturing methods which are generally referred to as a dry process that includes a physical vapor deposition method and a chemical vapor deposition method, as long as the methods are processes of being capable of film-forming a predetermined material into a thin film having the uniform film thickness. The film for the reflecting layer 3 is formed so as to have such a film thickness of 100 nm or more and 1,000 nm or less that the film shows a stability of the film thickness and can reflect a wavelength to be objected. For instance, the film of 250 nm is formed.

In the present embodiment, the example is described in which the foundation structure 4 is formed, but it is also acceptable to form the middle layer 2 directly on the base material 1 by stacking layers, without forming the foundation structure 4, and to work the optical surface.

Figure 6:
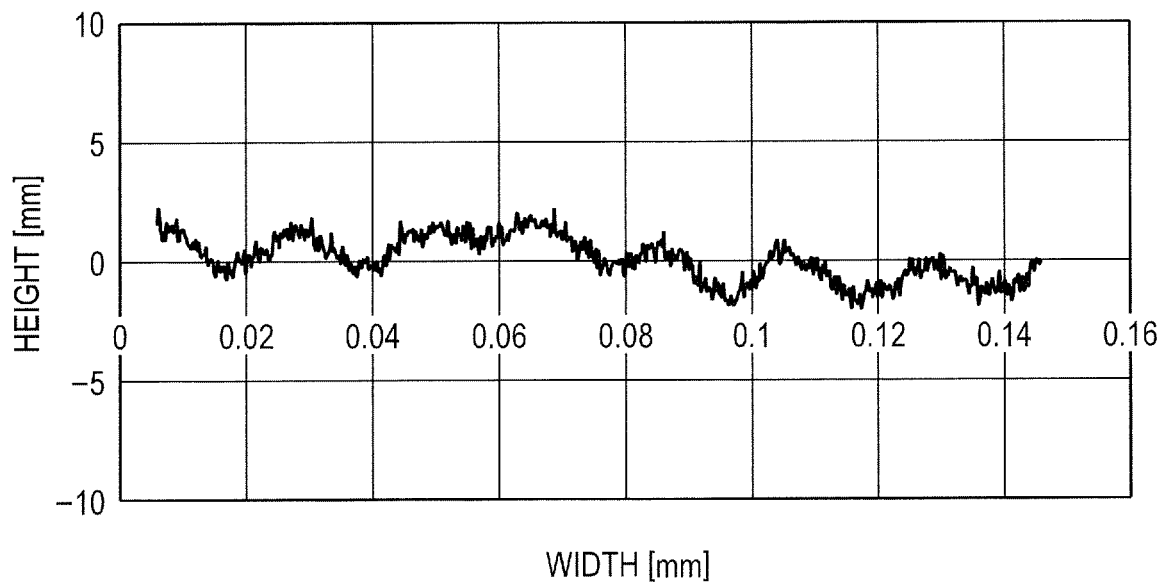
FIG. 6 is one example of a view in which one cross-sectional shape of an optical curved surface in Embodiment 1 of the present invention is plotted.

An optical element for integrated field, which the present embodiment provides and has a plurality of optical surfaces, can have a smooth mirror surface formed thereon so that light to be observed does not scatter excessively. FIG. 6 illustrates one example of a profile in which one cross section of an optical curved surface in the present embodiment is extracted, and a difference from the functional surface shape is plotted. As is illustrated in the figure, the smoothness of the optical curved surface in the present exemplary embodiment becomes approximately RMS 1 nm, and the surface can be more smoothened compared to RMS 5 nm of the cut surface of Al which has been described as the previous example. Accordingly, a smooth surface which can show a desired optical performance can be formed.

In addition, the plurality of optical surfaces having high smoothness can be integrally worked, and a relative positional relationship among the plurality of optical surfaces which is finely aligned can be formed with the high precision that corresponds to a movement precision of an ultra precise working apparatus.

Second Embodiment

Figure 4:
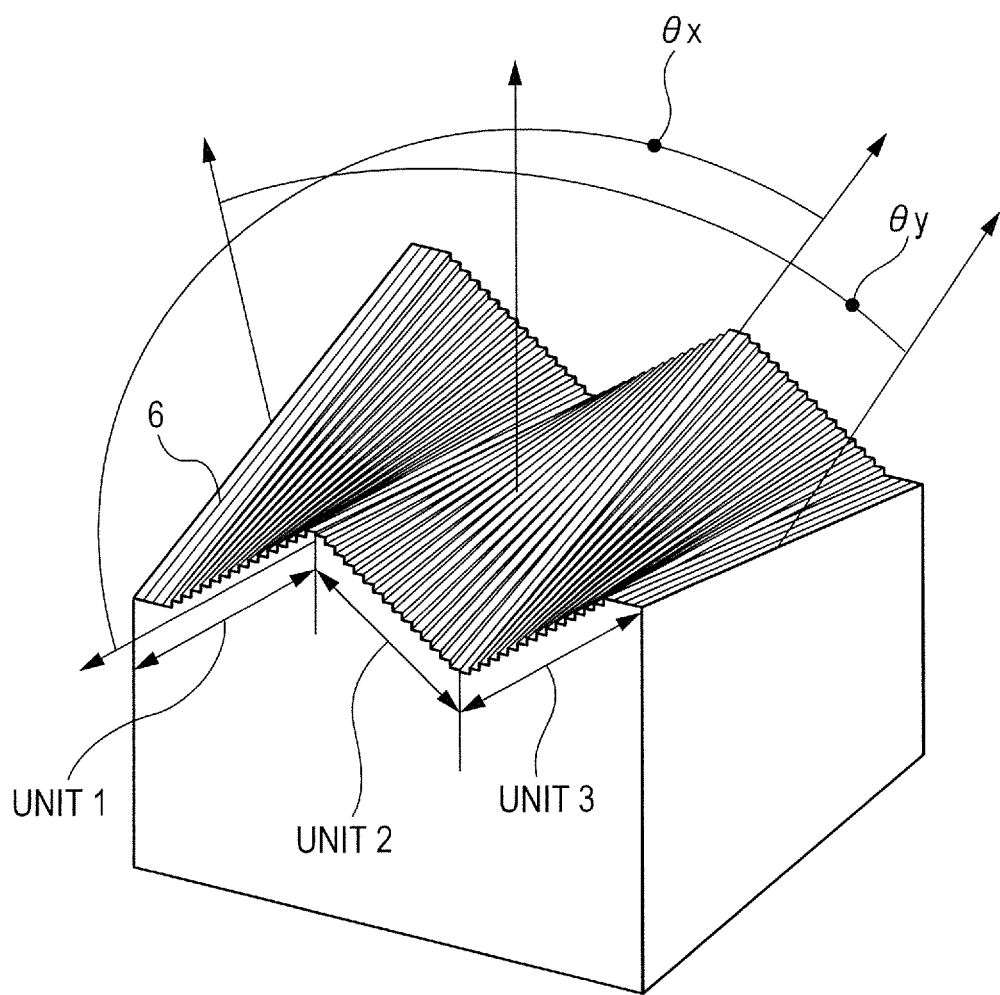
FIG. 4 is a schematic view illustrating an optical element in Embodiment 2 of the present invention.
Figure 5A:
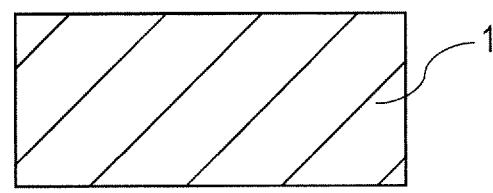
FIGS. 5A, 5B, 5C, 5D and 5E are schematic views illustrating a process of producing the element, for achieving an element structure in Embodiment 2 of the present invention.
Figure 5B:
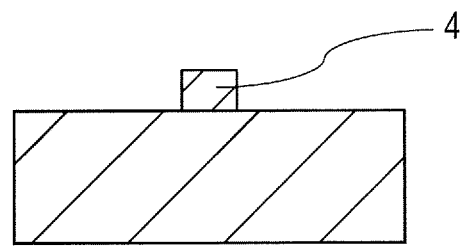
Figure 5C:
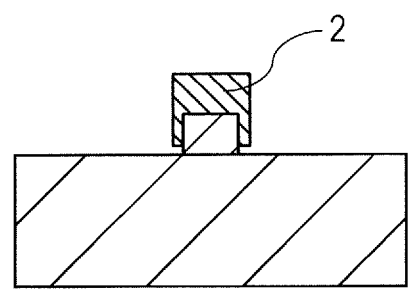
Figure 5D:
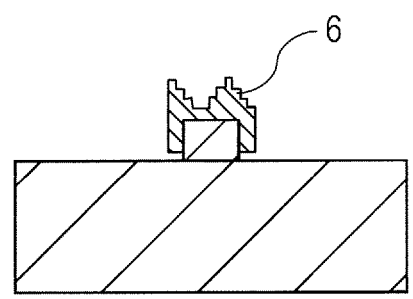
Figure 5E:
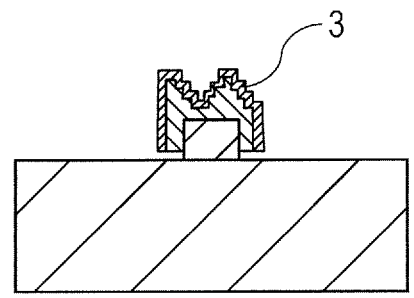

In the first embodiment, an example in which the optical surface is a curved surface has been described, but in the present embodiment, an optical element for integrated field, in which the optical surface is a flat surface, will be described below. FIG. 4 is a schematic view illustrating the optical element of the present embodiment. FIGS. 5A to 5E are sectional views illustrating a process of manufacturing the optical element of the present embodiment. In FIG. 4, a reflecting layer 3 is illustrated. An optical surface 6 is illustrated. In the present embodiment, the plurality of optical surfaces is divided into a plurality of units (in FIG. 4, three units), and arranged so that normal lines on the plurality of optical surfaces which is arranged in the respective units are in different directions. Specifically, the normal lines on the plurality of optical surfaces have a predetermined angle difference from each other, and are arranged in an angle range of θx. The angle difference among the units is defined by the normal lines of the optical surfaces which are arranged in the respective units. In the present embodiment, the unit 1 and the unit 3 are arranged within a range of the angle difference θy which is defined by the normal lines in the respective units.

In FIGS. 5A to 5E, a base material 1, a middle layer 2, the reflecting layer 3, a foundation structure 4, and the optical flat surface 6 are illustrated. The structures having similar functions as those in the first embodiment are designated by the same reference numerals, and the description is omitted.

In the present embodiment, similarly to the first embodiment, firstly, pre-harden steel corresponding to SUS420J2, for instance, is selected as the base material 1, and a cube of 25 mm×25 mm×10 mm, for instance, is cut out from a bulk material. It is desirable to work at least an installation fiducial portion (for instance, corner portion) when the optical element is worked, so as to make the precision of the flatness and perpendicularity high.

Next, the upper part of the cube is subjected to additional work so that the upper part becomes a shape along the optical surface in consideration of a positional relationship with the installation fiducial portion, as the foundation structure 4 for mounting the group of optical surfaces in the optical system for integrated field thereon, which is designed and arranged so as to obtain desired optical characteristics. In the present embodiment, the example is described in which the foundation structure 4 is formed, but it is acceptable to form the middle layer and the group of the optical surfaces directly on the base material 1 without forming the foundation structure 4.

Next, such a middle layer 2 is formed of stacked layers as to satisfy both of a function of alleviating a stress which is generated between the reflecting layer 3 and the base material 1, and a function of being capable of forming relative positional relationships among the plurality of optical surfaces which is finely aligned, with high precision. For instance, a copper sulfate plated material is selected as a material excellent in mirror-finish workability in particular. The copper sulfate plated material is an electroplated film which contains copper as a main ingredient, and forms a dense layered film with a wet process. The thickness of the plated layer shall be, for instance, 600 micrometers, so as to reduce stripping and cracking of the optical surface due to a thermal influence even under an extreme environment, and to enable the high unevennesses and fine arrangement of the optical surfaces to be formed by fine cutting. However, the thickness is not limited to 600 micrometers, and may be 10 μm or more and 3,000 μm or less.

Next, the middle layer 2 is removed by a fine cutting, for instance, with the use of a diamond tool of which the cutting edge has a straight portion, in consideration of the above described positional relationship with the installation fiducial portion, and thereby the optical surface shape having a flat surface is formed. In the fine cutting, it is necessary to form a smooth mirror surface which has 0.5 nm RMS or more and 2 nm RMS or less, and further can have 1 nm RMS or less, in order that the light to be observed does not scatter excessively, and as for a working condition at this time, it is desirable to set a removal thickness so as to be as small as possible. In the present exemplary embodiment, the form turning has been performed that uses a tool of which the cutting edge has a straightness of 20 nm or less in the straight portion, and transfers the movement precision of an ultra precise working apparatus of which the moving shaft has a straightness of 10 nm or less.

Finally, a reflecting layer 3 is formed which contains, for instance, silver having excellent reflecting characteristics in a visible light region. The reflecting layer needs to be formed into a thin film having a uniform thickness so that the shape of the optical surface formed on the middle layer is not destroyed as much as possible, and accordingly can be formed by the sputtering process, but the method is not limited to the sputtering process. It is also acceptable to employ various manufacturing methods which are generally referred to as a dry process that includes a physical vapor deposition method and a chemical vapor deposition method, as long as the methods are processes of being capable of film-forming a predetermined material into a thin film having the uniform film thickness.

A film thickness of the reflecting layer 3 is set, for instance, at 250 nm at which the film shows a stability of the film thickness and can reflect light having a wavelength to be objected. However, the film thickness is not limited to 250 nm.

In the present embodiment, the example is described in which the foundation structure 4 is formed, but it is also acceptable to form the middle layer 2 directly on the base material 1 by stacking layers, without forming the foundation structure 4, and to work the optical surface.

Figure 7:
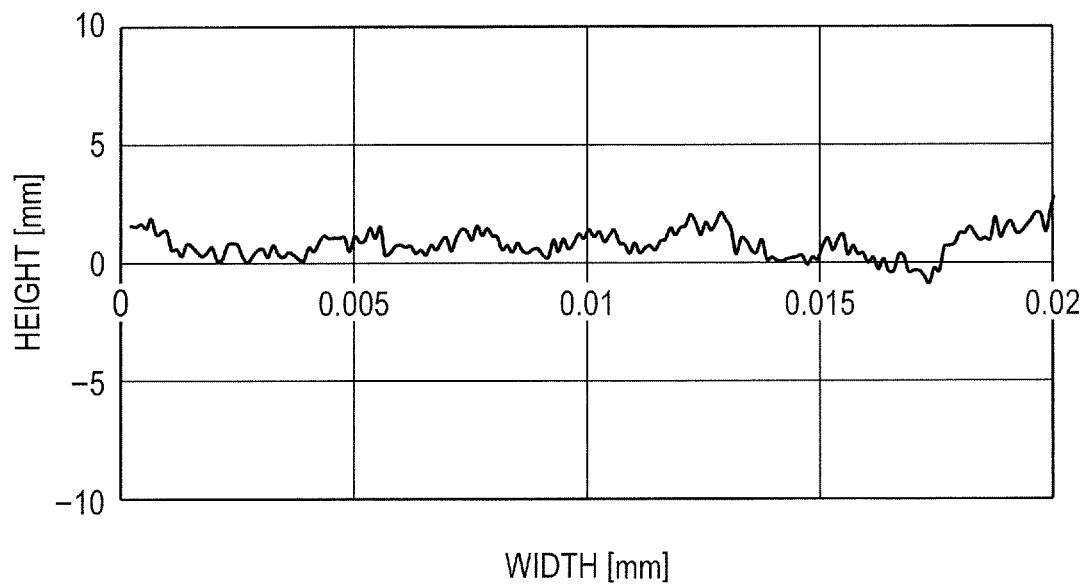
FIG. 7 is one example of a view in which one cross-sectional shape of an optical flat surface in Embodiment 2 of the present invention is plotted.

An optical element for integrated field, which is provided by the present embodiment and has a plurality of optical surfaces, can have a smooth mirror surface of approximately 1 nm RMS formed thereon so that light to be observed does not scatter excessively. FIG. 7 illustrates one example of a profile of one cross section extracted from cross sections of an optical flat surface in the present embodiment. As is illustrated in FIG. 7, the smoothness of the optical curved surface in the present exemplary embodiment becomes approximately RMS 1 nm or less, and the surface can be more smoothened compared to RMS 5 nm of the cut surface of Al which has been described as the previous example. Accordingly, a smooth surface which can show a desired optical performance can be formed.

Third Embodiment

Figure 8:
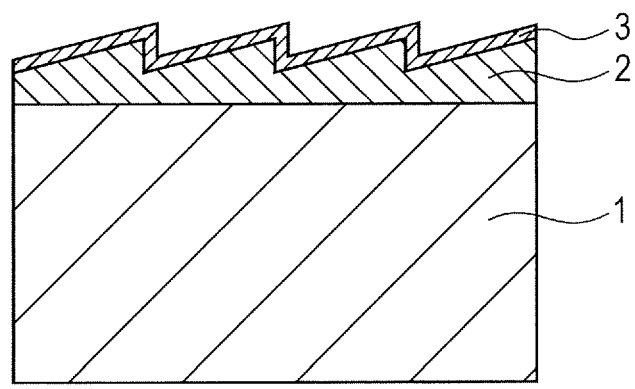
FIG. 8 is a schematic view illustrating one example of an element shape of a diffractive optical element in Embodiment 3 of the present invention.
Figure 9A:
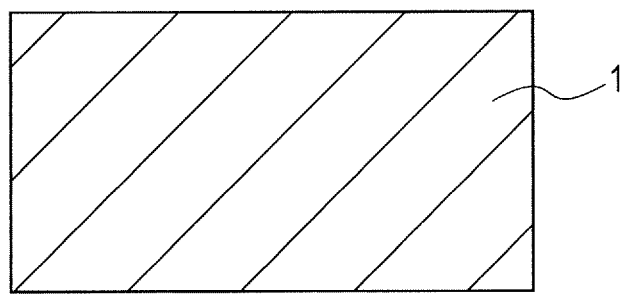
FIGS. 9A, 9B, 9C and 9D are schematic views illustrating a process of producing the element for achieving the element structure of the diffractive optical element in Embodiment 3 of the present invention.
Figure 9B:
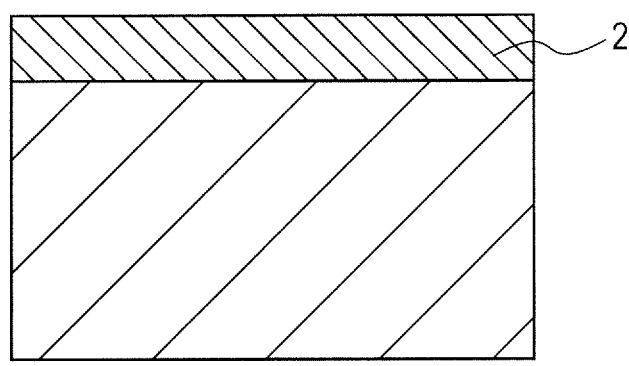
Figure 9C:
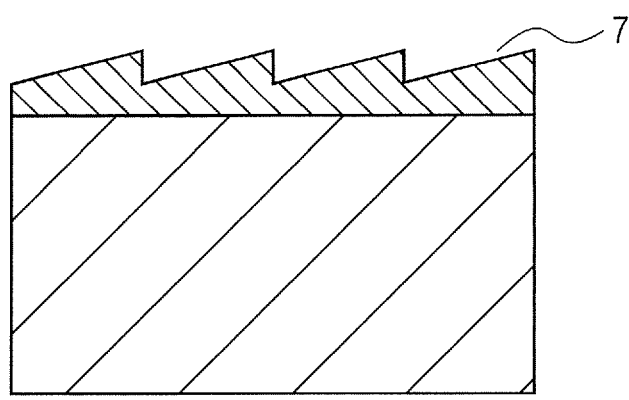
Figure 9D:
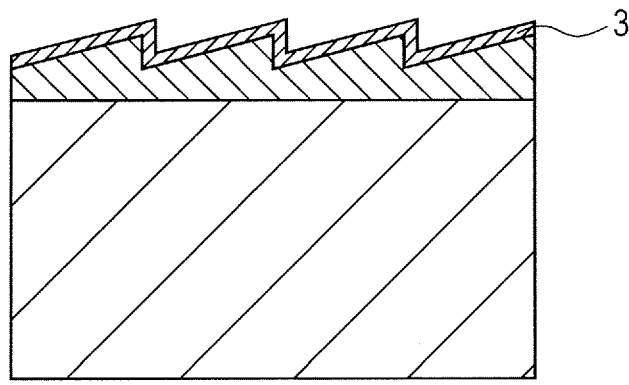

In the present embodiment, a diffractive optical element will be described below. FIG. 8 is a schematic view illustrating the optical element of the present embodiment. FIGS. 9A, 9B, 9C and 9D are schematic views illustrating a process of manufacturing the optical element of the present embodiment. In FIG. 8 and FIGS. 9A, 9B, 9C and 9D, a base material 1, a middle layer 2, a reflecting layer 3 and a lattice plane 7 are illustrated. The structures having similar functions as those in the first and second embodiments are designated by the same reference numerals, and the description is omitted.

In the present embodiment, the optical surface has a cross-sectional shape which is a periodic saw-like lattice shape, and is arranged so that the lattice plane has a predetermined angle. It is desirable to design the periodicity of the lattice and the angle of the lattice plane so that a high diffraction efficiency is obtained with respect to a desired order and a desired wavelength. In the present embodiment, the periodicity of the lattice shape has been set at approximately 90 μm, and the angle of the lattice plane has been set at approximately 80 degrees.

In the present embodiment, firstly, a low thermal expansion glass is selected as a base material 1, and a cube of 200 mm×60 mm×60 mm is cut out from a bulk material. The reason is to regularly maintain the shape precision of the whole element even under a severe temperature environment, and therefore, a base material having a low linear expansion coefficient is selected. As has been described above, the material in the element structure is not limited, and it is acceptable to employ pre-harden steel corresponding to SUS420J2, a low thermal expansion material, quartz, glass and the like.

Next, similarly to the first and second embodiments, such a middle layer 2 is formed of stacked layers as to satisfy both of a function of alleviating a stress which is generated between the reflecting layer 3 and the base material 1, and a function of being capable of forming relative positional relationships among the plurality of optical surfaces which is finely aligned, with high precision. For instance, a copper sulfate plated material is selected as a material excellent in mirror-finish workability in particular. The copper sulfate plated material is an electroplated film which contains copper as a main ingredient, and forms a dense layered film with a wet process. The thickness of the plated layer shall be, for instance, 50 micrometers, so as to reduce stripping and cracking of the optical surface due to a thermal influence even under an extreme environment, and to enable the high unevenness and fine arrangement of the optical surfaces to be formed by fine cutting. However, the thickness is not limited to 50 micrometers, and may be 10 μm or more and 3,000 μm or less.

Next, the middle layer 2 is removed by a fine cutting, for instance, with the use of a diamond tool of which the cutting edge has a straight portion, and thereby the optical surface shape is formed, of which the cross-sectional shape is a periodic saw-like lattice shape. In other words, the lattice plane 7 becomes the optical surface. In the fine cutting, it is necessary to form a smooth mirror surface which has 0.5 nm RMS or more and 2 nm RMS or less, and further can have 1 nm RMS or less, in order that the light to be observed does not scatter excessively, and as for a working condition at this time, it is desirable to set a removal thickness so as to be as small as possible. In the present exemplary embodiment, the form turning has been performed that uses a tool of which the cutting edge has a straightness of 20 nm or less in the straight portion, and transfers the movement precision of an ultra precise working apparatus of which the moving shaft has a straightness of 10 nm or less.

Finally, a reflecting layer 3 is formed which contains, for instance, gold having excellent reflecting characteristics in an infrared region. The reflecting layer needs to be formed into a thin film having a uniform thickness so that the shape of the optical surface formed on the middle layer is not destroyed as much as possible, and accordingly can be formed by the sputtering process, but the method is not limited to the sputtering process. It is also acceptable to employ various manufacturing methods which are generally referred to as a dry process that includes a physical vapor deposition method and a chemical vapor deposition method, as long as the methods are processes of being capable of film-forming a predetermined material into a thin film having the uniform film thickness.

A film thickness of the reflecting layer 3 is set, for instance, at 250 nm at which the film shows the stability of the film thickness and can reflect light having a wavelength to be objected. However, the film thickness is not limited to 250 nm.

The diffractive optical element which is provided by the present embodiment can have a smooth mirror surface of approximately 2 nm RMS formed thereon so that light to be observed does not scatter excessively. In other words, the diffractive optical element can have a high intensity ratio of diffracted light with respect to incident light, and excellent spectral performance. In addition, the low thermal expansion glass is selected for the base material, and thereby the shape change of the whole element due to thermal influence can be reduced.

Fourth Embodiment

Figure 10:
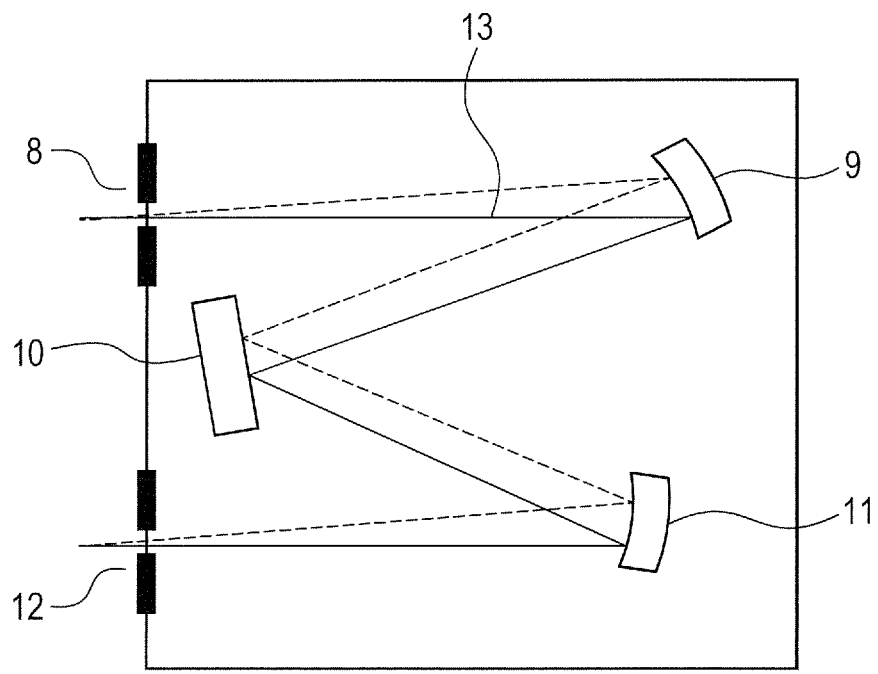
FIG. 10 is a schematic view illustrating one example of a spectroscopic apparatus in Embodiment 4 of the present invention.
Figure 11:
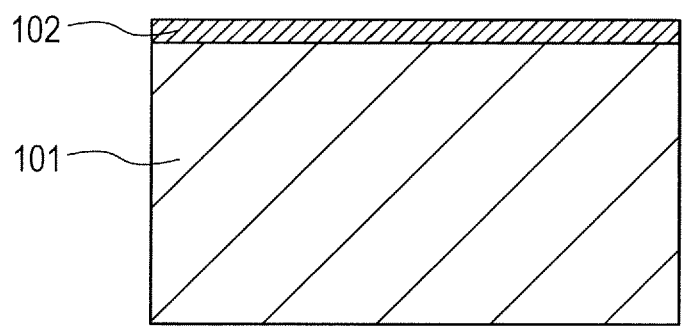
FIG. 11 is a schematic view illustrating a material configuration of an optical element of a conventional example.

In the present embodiment, a spectroscopic apparatus which contains the diffractive optical element of the third embodiment will be described below. FIG. 10 is a schematic view illustrating one example of the spectroscopic apparatus in the present embodiment. In FIG. 10, an incident slit 8, a first concave mirror 9, a diffractive optical element 10, a second concave mirror 11, an exit slit 12 and rays of light 13 are illustrated. The configuration of the spectroscopic apparatus in the present embodiment is one example, and other configurations are not limited, as long as the configuration includes the optical element and the diffractive optical element which have a plurality of optical surfaces thereon and are described, for instance, in claims 1 and 1a. Various components may be included in combination. In FIGS. 9A, 9B, 9C and 9D, the rays of light pass through the incident slit, and are condensed by the first concave mirror having a condensing function, and are dispersed according to the wavelengths in the diffractive optical element. The rays of light, which have been dispersed into particular wavelengths, are condensed by the second concave mirror, and pass through the exit slit. In elements which determine the performance of the spectroscopic apparatus according to the present embodiment, there is a production precision of the diffractive optical element. For instance, the surface roughness of the optical surface of the diffractive optical element can be smoothened, and accordingly light resists being scattered. Specifically, the total amount of light other than light having particular wavelengths is reduced, thereby stray light of the whole spectroscopic apparatus is reduced, and efficient spectral performance is obtained. In addition, the diffractive optical element contained in the spectroscopic apparatus which is obtained by the present embodiment can have a lattice plane having pitch precision and shape precision of the order of nanometer formed thereon, and accordingly can provide a spectroscopic apparatus having high diffraction efficiency. In addition, the diffractive optical element can reduce the shape change of the optical element due to the thermal influence, and accordingly can provide a spectroscopic apparatus excellent in an environment resistant performance.

The optical element according to the present invention has a plurality of optical surfaces formed on a single base material through a middle layer, thereby has a surface roughness of high grade and a relative positional relationship of high precision among a plurality of optical surfaces, and at the same time can reduce stripping and cracking of the optical surface due to a thermal influence, even when being used in an extreme environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126678, filed Jun. 19, 2014, which is hereby incorporated by reference herein in its entirety.

What is claimed is:

1. A manufacturing method of an optical element, wherein the optical element comprises a middle layer between a base and a reflecting layer, the middle layer having an intermediate thermal expansion coefficient that is between a thermal expansion coefficient of the base and a thermal expansion coefficient of the reflecting layer, the method comprising:
forming the middle layer;
forming a plurality of concave-convex structures in the middle layer; and
forming the reflecting layer on the plurality of concave-convex structures,
wherein the middle layer is formed by a copper sulfate plating.

2. A manufacturing method of an optical element, wherein the optical element comprises a middle layer between a base and a reflecting layer, the middle layer having an intermediate thermal expansion coefficient that is between a thermal expansion coefficient of the base and a thermal expansion coefficient of the reflecting layer, the method comprising:
forming the middle layer;
forming a plurality of concave-convex structures in the middle layer; and
forming the reflecting layer on the plurality of concave-convex structures,
wherein the middle layer comprises a plurality of stacked layers, and
wherein the plurality of layers are formed from respectively different materials.

3. A manufacturing method of an optical element, the method comprising:
forming a plated film by a copper sulfate plating on a base;
forming a plurality of concave-convex structures in the plated film; and
forming a reflecting film on the plurality of concave-convex structures,
wherein a layer having the plurality of concave-convex structures is between the base and the reflecting film.

4. The manufacturing method according to claim 3, wherein the plated film is formed by an electroplating.

5. The manufacturing method according to claim 3, wherein the plurality of concave-convex structures is formed by cutting the plated film.

6. A spectroscopic apparatus using light dispersed by the optical element manufactured by the manufacturing method according to claim 3.

7. The manufacturing method according to claim 3, wherein the plated film contains Cu as a main ingredient.

8. The manufacturing method according to claim 5, wherein the plated film as a thickness of 3000 µm or less before the cutting, and
wherein the reflecting film is formed on the plated film subjected to the cutting.

9. The manufacturing method according to claim 3, wherein the plurality of concave-convex structures have surface roughness of 2 nm RMS or less.

10. The manufacturing method according to claim 3, wherein the plated film has a thickness of 10 µm or more.

11. The manufacturing method according to claim 3, wherein the reflecting film contains one or more of Au, Ag, and Al as a main ingredient.

12. The manufacturing method according to claim 11, wherein the base comprises glass.

13. The manufacturing method according to claim 3, wherein the plurality of concave-convex structures are formed such that normal lines on the plurality of concave-convex structures are in a plurality of directions.

14. The manufacturing method according to claim 3, wherein the plurality of concave-convex structures are gratings.

15. The manufacturing method according to claim 3, wherein each of the plurality of concave-convex structures comprises a concave surface.

16. The manufacturing method according to claim 11, wherein the plurality of concave-convex structures are formed such that normal lines on the plurality of concave-convex structures are in a plurality of directions.

17. The manufacturing method according to claim 11, wherein the plurality of concave-convex structures are gratings.

18. The manufacturing method according to claim 11, wherein each of the plurality of concave-convex structures comprises a concave surface.

19. The manufacturing method according to claim 3, wherein the reflecting film has, on a side opposite to the base, a shape corresponding to the plurality of concave-convex structures in the plated film.

20. The manufacturing method according to claim 3, wherein the plated film has, on a side of the base, a surface flatter than the plurality of concave-convex structures in the plated film.

* * * * *